United States Patent
Beier et al.

(10) Patent No.: US 11,619,319 B2
(45) Date of Patent: Apr. 4, 2023

(54) VALVE DEVICE FOR A GASEOUS MEDIUM, AND TANK DEVICE FOR STORING A GASEOUS MEDIUM

(71) Applicant: Robert Bosch GmbH, Stuttgart (DE)

(72) Inventors: Marco Beier, Rudolstadt (DE); Christian Grimminger, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/275,323

(22) PCT Filed: Jul. 17, 2019

(86) PCT No.: PCT/EP2019/069267
§ 371 (c)(1),
(2) Date: Mar. 11, 2021

(87) PCT Pub. No.: WO2020/052834
PCT Pub. Date: Mar. 19, 2020

(65) Prior Publication Data
US 2022/0049790 A1    Feb. 17, 2022

(30) Foreign Application Priority Data
Sep. 11, 2018  (DE) ................... 10 2018 215 380.9

(51) Int. Cl.
*F16K 31/40* (2006.01)
*F16K 27/02* (2006.01)
(Continued)

(52) U.S. Cl.
CPC .......... *F16K 31/408* (2013.01); *F16K 27/029* (2013.01); *F16K 31/0648* (2013.01); *F16K 31/0651* (2013.01); *F16K 39/024* (2013.01)

(58) Field of Classification Search
CPC ............... F16K 31/408; F16K 31/0648; F16K 31/0651; F16K 27/029; F16K 39/024
See application file for complete search history.

(56) References Cited

U.S. PATENT DOCUMENTS

| | | | |
|---|---|---|---|
| 3,100,103 A | 8/1963 | Bullard | |
| 5,735,582 A * | 4/1998 | Eith | ........ B60T 8/4872 251/30.01 |

(Continued)

FOREIGN PATENT DOCUMENTS

| | | |
|---|---|---|
| CN | 101308935 A | 11/2008 |
| CN | 105090598 A | 11/2015 |

(Continued)

OTHER PUBLICATIONS

Translation of the International Search Report for Application No. PCT/EP2019/069267 dated Oct. 2, 2019 (3 pages).

*Primary Examiner* — Eric Keasel
(74) *Attorney, Agent, or Firm* — Michael Best & Friedrich LLP

(57) ABSTRACT

The invention relates to a valve device (100) for a gaseous medium, in particular hydrogen, comprising a valve housing (6) and a solenoid armature (14) which is arranged in the valve housing and can move along the longitudinal axis (18) and which interacts with a first sealing seat (32) in order to open and close an outlet opening (40). Furthermore, the valve housing (6) is equipped with a second solenoid armature (16) which can be moved along the longitudinal axis (18) and which is at least partly received in a recess (38) of the first solenoid armature (14), and the second solenoid armature (16) interacts with a second sealing seat (34) in order to open and close an outlet opening (20) formed in the first solenoid armature (14). The first solenoid armature (14) and the second solenoid armature (16) are additionally surrounded by a magnet device (11), by means of which the first solenoid armature (14) and the second solenoid armature (16) can be moved along the longitudinal axis (18) using precisely one solenoid (10).

13 Claims, 2 Drawing Sheets

(51) Int. Cl.
*F16K 31/06* (2006.01)
*F16K 39/02* (2006.01)

(56) References Cited

U.S. PATENT DOCUMENTS

| | | | |
|---|---|---|---|
| 6,955,186 B2* | 10/2005 | Kill | F16K 31/0606 335/265 |
| 7,730,905 B2* | 6/2010 | Suzuki | F17C 13/04 251/30.03 |
| 9,366,357 B2 | 6/2016 | Zieger et al. | |
| 2004/0155215 A1 | 8/2004 | Kill et al. | |
| 2011/0025439 A1 | 2/2011 | Rettinger et al. | |
| 2011/0068286 A1 | 3/2011 | Nomichi | |
| 2013/0186487 A1 | 7/2013 | Nomichi et al. | |
| 2014/0166915 A1 | 6/2014 | Ishibashi et al. | |
| 2016/0169404 A1* | 6/2016 | Choi | F16K 31/408 251/129.15 |

FOREIGN PATENT DOCUMENTS

| | | |
|---|---|---|
| DE | 102006011755 A1 | 9/2007 |
| DE | 102015221423 A1 | 6/2016 |
| JP | 2001227670 A | 8/2001 |
| JP | 2010121728 A | 6/2010 |
| JP | 2010247548 A | 11/2010 |
| JP | 2011149502 A | 8/2011 |

\* cited by examiner

VALVE DEVICE FOR A GASEOUS MEDIUM, AND TANK DEVICE FOR STORING A GASEOUS MEDIUM

BACKGROUND OF THE INVENTION

The invention relates to a valve apparatus for a gaseous medium and to a tank apparatus for a fuel cell tank, in particular for storing hydrogen, for example for use in vehicles with a fuel cell drive.

DE 10 2018 209 057 A1, which is not a prior publication, describes a tank apparatus for thermally activated pressure relief of a fuel cell tank, wherein the tank apparatus comprises tank containers having various valves, such as for example a shut-off valve, which ensure proper functioning for example of a fuel cell system.

The safety apparatuses for such a tank apparatus are standardized. Here, each tank apparatus must have such a shut-off valve. In this way, in the event of damage to the tank apparatus caused by an accident involving a vehicle with a fuel cell drive or in the event of breakage of a line of the tank apparatus, the shut-off valve can close off the tank containers, so that no gas can exit the storage unit.

Owing to the high safety requirements for the shut-off valves and owing to high system pressures of for example 800 bar or more, such shut-off valves present great challenges in terms of construction and have a large structural space. This in turn increases the overall weight of the tank apparatus as a whole, which, in the event of an accident involving a vehicle with a fuel cell drive, can result in large active acceleration forces and possible deformations of the valve apparatus or the tank apparatus.

SUMMARY OF THE INVENTION

The valve apparatus according to the invention has by contrast the advantage that, with structurally simple functioning, the structural space of the valve apparatus is reduced through use of a double-stroke switching valve.

For this purpose, the valve apparatus according to the invention for a gaseous medium, in particular hydrogen, has a valve housing in which a first magnet armature, which is movable along a longitudinal axis, is arranged. The first magnet armature interacts with a first sealing seat for opening and closing an outlet opening. Furthermore, a second magnet armature, which is movable along a longitudinal axis, is arranged in the valve housing, said second magnet armature being received at least partially in a recess of the first magnet armature, and said second magnet armature interacting with a second sealing seat for opening and closing a passage opening formed in the first magnet armature. Furthermore, the first magnet armature and the second magnet armature are comprised by a magnet device, by way of which magnet device the first magnet armature and the second magnet armature are movable along the longitudinal axis by means of exactly one magnet coil.

The use of only one magnet coil results in a reduction of the structural space and in the total weight of the valve apparatus being achieved. Furthermore, owing to the use of two magnet armatures interacting with one another, no control spaces are necessary, whereby structural space is also minimized. Additionally, owing to the double-stroke switching valve with two magnet armatures, for the opening of the valve apparatus, a small magnetic force is sufficient.

In a first advantageous refinement, it is provided that the magnet coil has a coil housing and at least partially surrounds the first magnet armature and the second magnet armature in the valve housing. In this way, with an active magnet coil, a magnetic force acting on the first magnet armature and the second magnet armature can be generated in a simple manner.

In a further configuration of the invention, it is advantageously provided that a spring is arranged in the valve housing, which spring subjects the second magnet armature to a force in the direction of the second sealing seat, whereby the first magnet armature is subjected to a force in the direction of the first sealing seat.

In an advantageous refinement, a stop element is arranged in the valve housing, on which stop element the first sealing seat is formed. Advantageously, a flow cross section at the first sealing seat is larger than a flow cross section at the second sealing seat. In this way, the second magnet armature is longitudinally movable in a simple manner and by a small magnetic force and, when lifting off from the second sealing seat, opens a flow cross section via the second sealing seat. As a result of the consequently changing pressure conditions in the valve apparatus, the opening of the first sealing seat and thus the longitudinal movement of the first magnet armature are sped up and the required magnitude of the magnetic force can thus be reduced.

In a further configuration of the invention, it is advantageously provided that the first magnet armature has a shoulder, which shoulder interacts with a shoulder of the second magnet armature, and, during a longitudinal movement of the second magnet armature, the latter serves as a driver for the first magnet armature. This makes it possible for the opening of the first sealing seat and thus the longitudinal movement of the first magnet armature to be sped up.

In advantageous uses, the valve apparatus may be used in a tank apparatus for storing a gaseous medium, in particular hydrogen, that has a tank. Advantageously, the tank comprises a tank housing with a neck region, in which neck region the valve apparatus is arranged, wherein the valve housing is integrated at least partially into the tank housing, and the valve housing seals off a tank interior space of the tank by means of a sealing element.

Consequently, by way of the valve apparatus, a throughflow cross section for gaseous medium, in particular hydrogen, from the tank is advantageously controllable.

The tank apparatus described is preferably suitable in a fuel cell arrangement for storing hydrogen for the operation of a fuel cell.

BRIEF DESCRIPTION OF THE DRAWINGS

The drawing illustrates exemplary embodiments of a valve apparatus according to the invention for a gaseous medium, in particular hydrogen, and a tank apparatus according to the invention for storing a gaseous medium. In the drawing.

DETAILED DESCRIPTION

Figure 1:
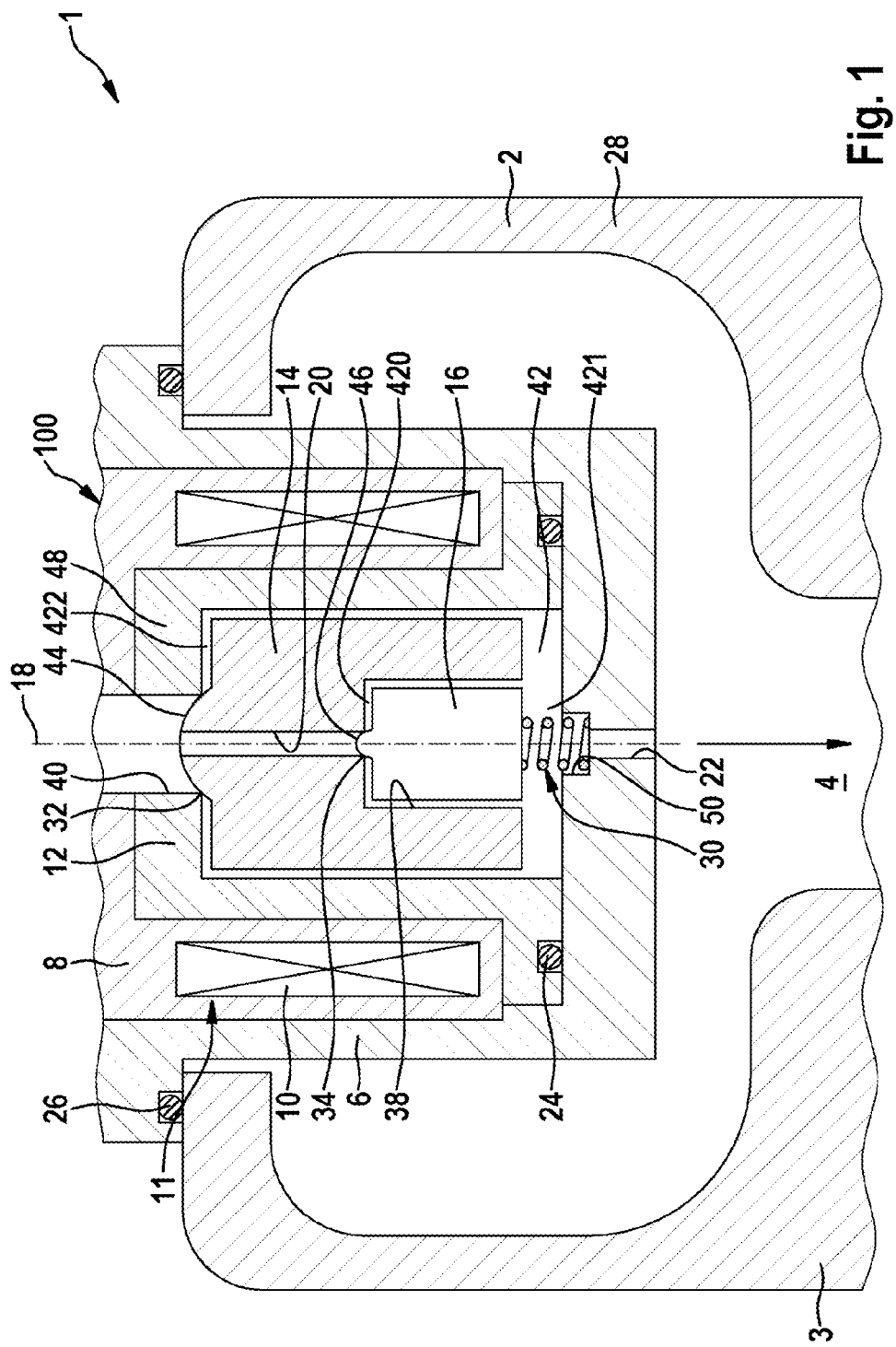
FIG. 1 shows, in longitudinal section, a first exemplary embodiment of a valve apparatus according to the invention in a tank apparatus.

FIG. 1 shows, in longitudinal section, a first exemplary embodiment of a valve apparatus 100 according to the invention for a gaseous medium, in particular hydrogen, in a tank apparatus 1 according to the invention for storing a gaseous medium, in particular hydrogen.

The valve apparatus 100 has a valve housing 6 with a longitudinal axis 18. An inlet opening 22 and an outlet opening 40 are formed in the valve housing 6 and open into an interior space 42. A magnet coil 10 with a coil housing 8 is furthermore arranged in the valve housing 6. The valve housing 6 furthermore comprises a stop element 12 which is surrounded by the coil housing 8 and which, by means of sealing elements 24, seals off the magnet coil 10 with respect to the interior space 42.

A first magnet armature 14, which is movable along the longitudinal axis 18, is arranged in the interior space 42 and, by way of a formed-on portion 44, interacts with a first sealing seat 32 for opening and closing the outlet opening 40. The first sealing seat 32 is formed here on a shoulder 48 of the stop element 12. A passage opening 20 is formed in the first magnet armature 14 and, at that end of the first magnet armature 14 which faces away from the first sealing seat 32, opens into a recess 38.

A second magnet armature 16, which is movable along the longitudinal axis 18, is received in the recess 38 and, by way of a formed-on portion 46, interacts with a second sealing seat 34 for opening and closing the passage opening 20 in the first magnet armature 14. The second sealing seat 34 is formed on the first magnet armature 14.

By means of a spring 30 which is arranged in a recess 50 of the valve housing 6 and is supported between the second magnet armature 16 and the valve housing 6, the second magnet armature 16 is subjected to a force in the direction of the second sealing seat 34 such that the second magnet armature 16 bears on the second sealing seat 34. The passage opening 20 is consequently closed.

Due to the operative relationship between the first magnet armature 14 and the second magnet armature 16, the first magnet armature 14 is pushed against the first sealing seat 32 by means of the spring 30, with the result that the outlet opening 40 is closed.

The interior space 42 is divided by the first magnet armature 14 and the second magnet armature 16 into an outer ring space 422, an inner ring space 420 and a spring space 421. Here, the outer ring space 422 is delimited by the stop element 12 and the first magnet armature 14, whereas the inner ring space 420 is delimited by the first magnet armature 14 and the second magnet armature 16.

Both the inner ring space 420 and the outer ring space 422 open into the spring space 421, wherein the spring space 421 comprises the recess 50 of the valve housing 6 and transitions into the inlet opening 22.

The valve apparatus 100 is part of a tank apparatus 1 with a tank 2. The tank 2 has a tank housing 3 in which a tank interior space 4 is formed. The tank housing 3 has a neck region 28 in which the valve apparatus 100 is arranged. Here, the latter is integrated into the tank housing 3 and, in the process, closes off the tank interior space 4 to the outside. By means of seal elements 26 between the valve housing 6 of the valve apparatus 100 and the tank housing 3 of the tank 2, the tank interior 4 is sealed off, with the result that gaseous medium, in particular hydrogen, can flow into or out of the tank 2 only via the valve apparatus 100.

The first magnet armature 14 and the second magnet armature 16 form, together with the magnet coil 10 and the coil housing 8, a magnet device 11.

Here, a flow cross section of the gaseous medium at the first valve seat 32 is larger than a flow cross section of the gaseous medium at the second valve seat 34 since the diameter of the cylindrical outlet opening 40 is larger than the diameter of the cylindrical passage opening 20.

Functioning of the Valve Apparatus

If the magnet coil 10 is not electrically energized, the first valve seat 32 and the second valve seat 34 are closed by the force of the spring 30, with the result that the connections between the outer ring space 422 and the outlet opening 40 and between the inner ring space 420 and the passage opening 20 are closed. Consequently, it is also the case that no gaseous medium can flow from the tank interior space 4 in the direction of a system, for example a fuel cell arrangement, via the inlet opening 22 and the outlet opening 40. High pressure of for example 700 bar prevails in the tank interior space 4. By contrast, low pressure prevails in the fuel cell arrangement.

If the magnet coil 10 is electrically energized, then a magnetic force acting on the first magnet armature 14 and the second magnet armature 16 is generated, said magnetic force being directed counter to the force of the spring 30 and the pressure forces on the first sealing seat 32 and on the second sealing seat 34. The smaller seat diameter at the second sealing seat 34 in comparison with the seat diameter at the first sealing seat 32 has the result that a smaller magnetic force is required for the opening of the second sealing seat 34 than for the opening of the first sealing seat 32. For a sufficiently large magnetic force, the second magnet armature 16 lifts off from the second sealing seat 34 and opens up the passage opening 20.

Gaseous medium then flows, via the inlet opening 22, the second sealing seat 34, the passage opening 20 and the outlet opening 40, from the tank interior space 4 out of the tank 2 in the direction of a system, for example a fuel cell arrangement. In this way, the pressure in the system increases, which results in the pressure difference at the first sealing seat 32 being reduced. As a result of the reduction in the pressure difference at the first sealing seat 32, the force which is counter to the magnetic opening force is also reduced. The increasing reduction in the pressure difference leads to opening of the first sealing seat 32. The first magnet armature 14 is thus lifted off from the first sealing seat 32 and, in this way, opens a connection between the outlet opening 40 and the outer ring space 422. Gaseous medium, hydrogen in this case, then flows, via the inlet opening 22, the outer ring space 422, the first sealing seat 32 and the outlet opening 40, from the tank interior space 4 out of the tank 2 in the direction of a fuel cell of the fuel cell arrangement.

If it is intended for the supply of hydrogen to the fuel cell to be interrupted, the magnet coil 10 is no longer electrically energized, with the result that the magnetic force is reduced and the second magnet armature 16, by the force of the spring 30, is moved in the direction of the second sealing seat 34, and closes the latter, again. Here, the second magnet armature 16 acts as a driver for the first magnet armature 14, such that the first sealing seat 32 is also closed again.

The diameter at the first sealing seat 32 and the stroke of the first magnet armature 14 are advantageously configured in such a way that the fuel cell is provided with a sufficient mass flow of hydrogen in all operating states. Moreover, in this way, in the case of the tank 2 being filled with gaseous medium, hydrogen in this case, in which the flow direction is from the outlet opening 40 in the direction of the inlet opening 22, the tank 2 can be filled in a short period of time, for example in a few minutes.

Figure 2:
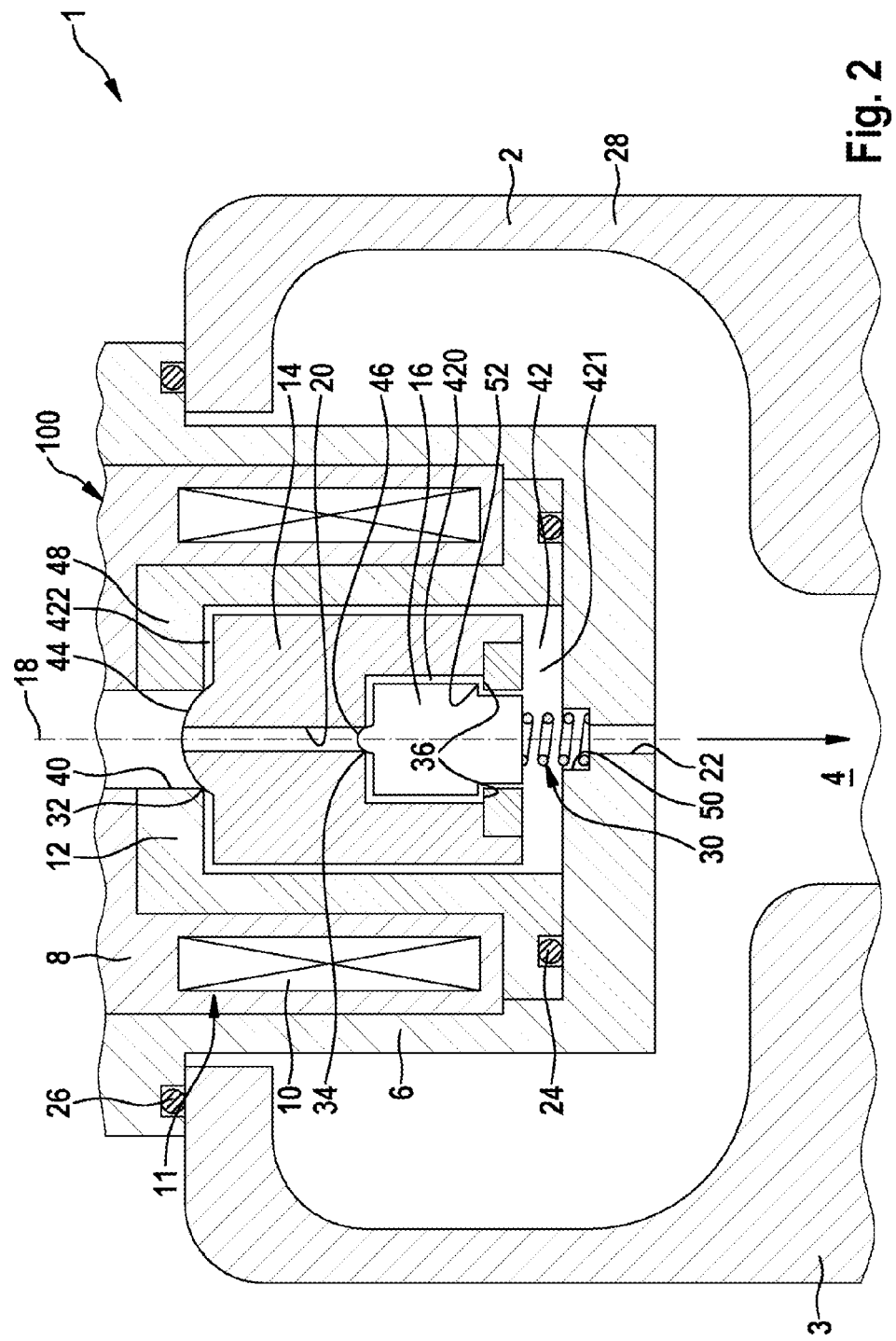
FIG. 2 shows, in longitudinal section, a second exemplary embodiment of a valve apparatus according to the invention in a tank apparatus.

FIG. 2 shows, in longitudinal section, a second exemplary embodiment of the valve apparatus 100 according to the invention for a gaseous medium, in particular hydrogen, in the tank apparatus 1 according to the invention for storing a gaseous medium, in particular hydrogen.

In terms of function and structure, the second exemplary embodiment corresponds substantially to the first exemplary embodiment. Components of identical function have been denoted by the same reference signs.

In the second exemplary embodiment, the first magnet armature 14 has a shoulder 36 which interacts with a shoulder 52 of the second magnet armature 16. Consequently, when the second sealing seat 34 opens, the second magnet armature 16 acts, during its longitudinal movement, as a driver for the first magnet armature 14, whereby the opening of the first sealing seat 32 is sped up.

What is claimed is:

1. A valve apparatus (100) for a gaseous medium, the valve apparatus having a valve housing (6) and having a first magnet armature (14) which is arranged therein and which is movable along a longitudinal axis (18), said first magnet armature (14) interacting with a first sealing seat (32) for opening and closing an outlet opening (40), wherein a second magnet armature (16), which is movable along the longitudinal axis (18), is arranged in the valve housing (6), said second magnet armature (16) being received at least partially in a recess (38) of the first magnet armature (14), and said second magnet armature (16) interacting with a second sealing seat (34) for opening and closing a passage opening (20) formed in the first magnet armature (14), characterized in that the first magnet armature (14) and the second magnet armature (16) are comprised by a magnet device (11), by way of which magnet device (11) the first magnet armature (14) and the second magnet armature (16) are movable along the longitudinal axis (18) by means of exactly one magnet coil (10), wherein the gaseous medium enters the valve housing (6) along the longitudinal axis (18)
    wherein a spring (30) is arranged in the valve housing (6), the spring (30) configured to force the second magnet armature (16) toward the second sealing seat (34), the spring (30) also configured to force the first magnet armature (14) toward the first sealing seat (32),
    wherein the spring (30) has a centerline that is collinear with the longitudinal axis (18),
    wherein the spring (30) is seated in a recess (50) of the valve housing (6), and
wherein an inlet opening (22) discharges directly into the recess (50) of the valve housing (6).

2. The valve apparatus (100) as claimed in claim 1, characterized in that the magnet coil (10) has a coil housing (8), and the magnet coil (10) at least partially surrounds the first magnet armature (14) and the second magnet armature (16) in the valve housing (6).

3. The valve apparatus (100) as claimed in claim 1, characterized in that a stop element (12) is arranged in the valve housing (6), on which stop element (12) the first sealing seat (32) is formed.

4. The valve apparatus (100) as claimed in claim 1, characterized in that a flow cross section at the first sealing seat (32) is larger than a flow cross section at the second sealing seat (34).

5. The valve apparatus (100) as claimed in claim 1, characterized in that the first magnet armature (14) has a shoulder (36), which shoulder (36) interacts with a shoulder (52) of the second magnet armature (16), and, during a longitudinal movement of the second magnet armature (16), the latter serves as a driver for the first magnet armature (14).

6. The valve apparatus (100) as claimed in claim 1, wherein the gaseous medium enters the valve housing (6) through the inlet opening (22), which has a centerline collinear with the longitudinal axis (18).

7. The valve apparatus (100) as claimed in claim 6, wherein the first magnet armature (14) and the second magnet armature (16) have centerlines collinear with the longitudinal axis (18).

8. The valve apparatus (100) as claimed in claim 7, wherein the outlet opening (40) is arranged at an opposite side of the valve housing (6) as the inlet opening (22), and the outlet opening (40) has a centerline collinear with the longitudinal axis (18).

9. The valve apparatus (100) as claimed in claim 8, wherein the valve apparatus (100) is configured such that:
    (A) when the second magnet armature (16) is not seated on the second sealing seat (34), the valve apparatus (100) passes the gaseous medium through the inlet opening, then between the first magnet armature (14) and the second magnet armature (16), then through the passage opening (20), and then through the outlet opening (40), and
    (B) when the first magnet armature (14) is not seated on the first sealing seat (32), the valve apparatus (100) is configured to pass the gaseous medium through the inlet opening, then around the first magnet armature (14), and then through the outlet opening (40).

10. A tank apparatus (1) for storing a gaseous medium, the tank apparatus having a tank (2) and having a valve apparatus (100) as claimed in claim 1.

11. The tank apparatus (1) as claimed in claim 10, characterized in that the tank (2) comprises a tank housing (3) with a neck region (28), in which neck region (28) the valve apparatus (100) is arranged, wherein the valve housing (6) is integrated at least partially into the tank housing (3), and the valve housing (6) seals off a tank interior space (4) of the tank (2) by means of a sealing element (26).

12. The tank apparatus (1) as claimed in claim 10, wherein the valve apparatus (100) is configured to control a through-flow cross section for gaseous medium from the tank (2).

13. A fuel cell arrangement having a tank apparatus (1) as claimed in claim 10 for storing hydrogen for the operation of a fuel cell.

* * * * *